(No Model.)  3 Sheets—Sheet 1.

H. L. PLISSON.
VEHICLE SEAT.

No. 348,053. Patented Aug. 24, 1886.

(No Model.) 3 Sheets—Sheet 2.

H. L. PLISSON.
VEHICLE SEAT.

No. 348,053. Patented Aug. 24, 1886.

(No Model.) 3 Sheets—Sheet 3.
H. L. PLISSON.
VEHICLE SEAT.
No. 348,053. Patented Aug. 24, 1886.

Witnesses:
Inventor
Hippolyte L. Plisson,
per Henry ___,
his attorney.

UNITED STATES PATENT OFFICE.

HIPPOLYTE LAINÉ PLISSON, OF ARESNELLES, FRANCE.

VEHICLE-SEAT.

SPECIFICATION forming part of Letters Patent No. 348,053, dated August 24, 1886.

Application filed June 21, 1886. Serial No. 205,839. (No model.)

*To all whom it may concern:*

Be it known that I, HIPPOLYTE LAINÉ PLISSON, a citizen of the French Republic, and a resident of Aresnelles, in the said French Republic, have invented certain new and useful Improvements in Vehicle-Seats; and I hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1:
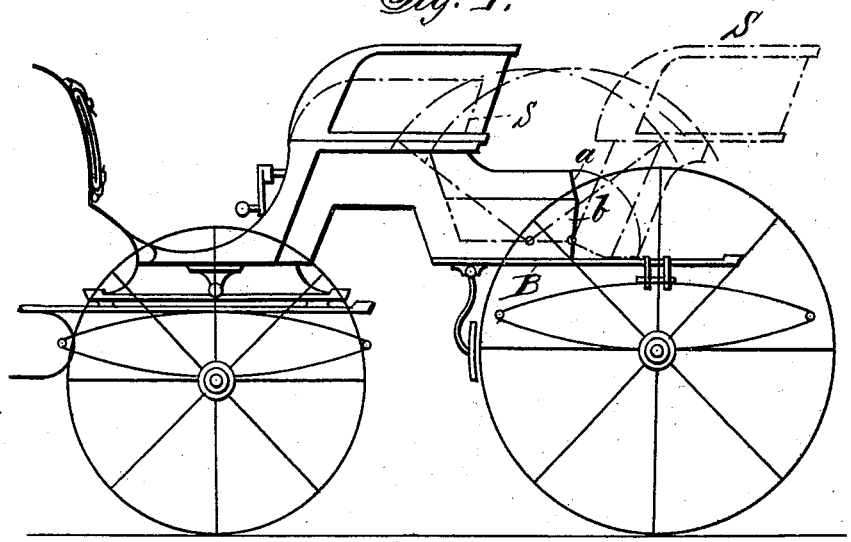
Figure 2:
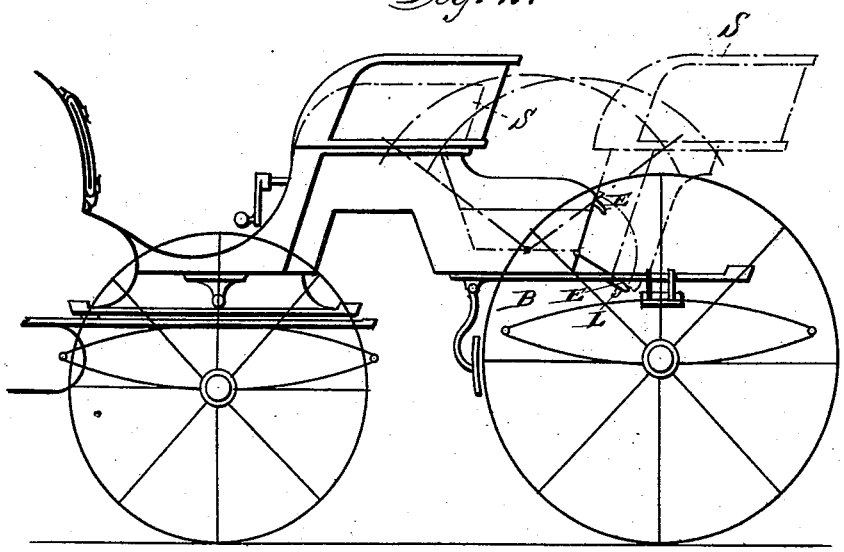
Figure 3:
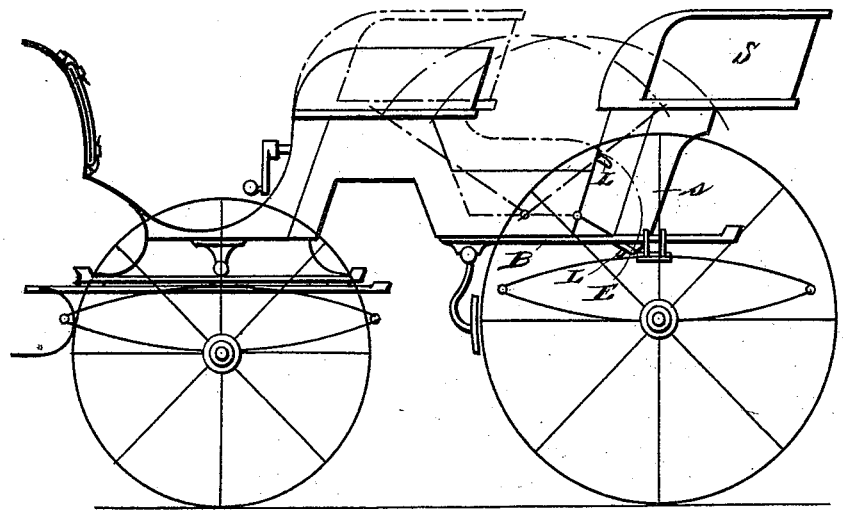
Figure 4:
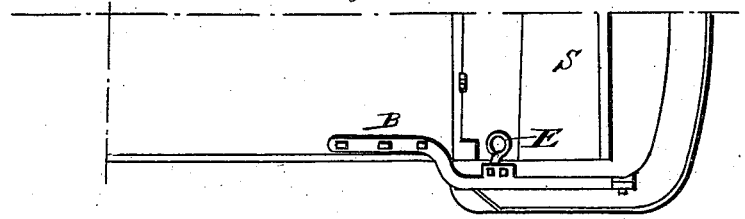
Figure 5:
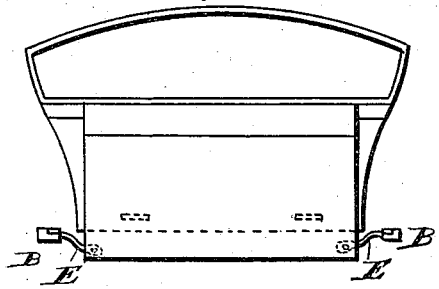
Figure 6:
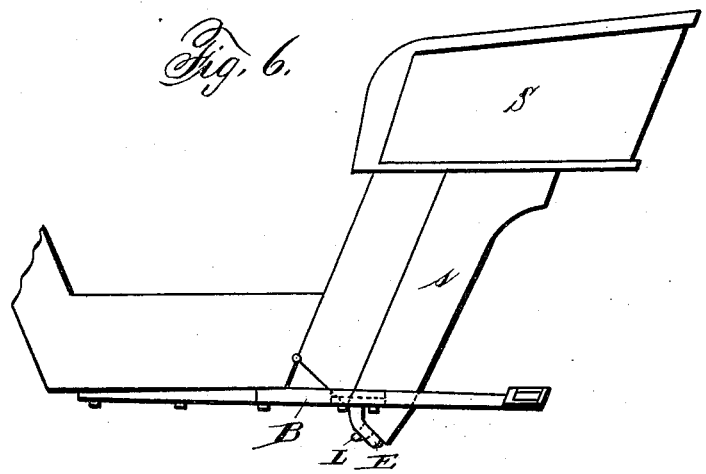
Figure 7:
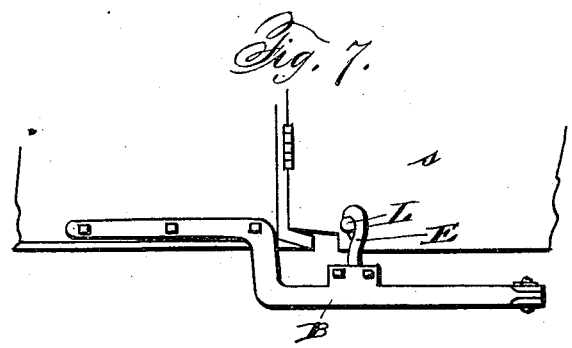
Figure 8:
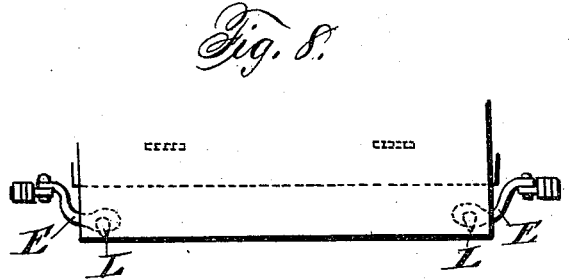

Referring to the drawings, Figure 1 is a side elevation of a vehicle known as the "Oppenheim dog-cart." Fig. 2 is a like view of such a vehicle constructed according to my invention, showing the rear seat tilted onto the front seat. Fig. 3 is a like view showing the rear seat in position for use. Fig. 4 is an under side plan view of part of the vehicle-frame and tilting seat. Fig. 5 is a rear elevation of the tilting seat. Fig. 6 is a side elevation of a part of the vehicle-body, the tilting seat, and support therefor, drawn to an enlarged scale. Fig. 7 is a view similar to Fig. 4, drawn to an enlarged scale; and Fig. 8 is a rear elevation of the tilting seat and its supports shown in Fig. 7, also drawn to an enlarged scale.

This invention relates to that class of vehicles that are convertible from a one-seat to a two-seat vehicle, and vice versa, the rear seat being constructed to swing forward onto the front seat, as described, for instance, in the several Letters Patent of the United States granted to F. Oppenheim, of San Francisco, California. In this class of vehicles the boxing or framing for the seats or their supports are not very graceful in their configuration, and have a heavy and clumsy appearance. This is also the case in the later improvements of this style of vehicles known as the "Oppenheim dog-cart," in which the rear seat rests upon side bars, and in order to give the seat a firm bearing the bearing-surface of the standards or boxing thereof must be absolutely horizontal, so that when the rear seat is tilted onto the front seat the boxing for said rear seat necessarily presents an inclined or beveled surface, as at *a b*, Fig. 1.

The object of this invention is to provide means whereby any desired form may be given to the standards or boxing or framing for the rear seat, so that when folded onto the front seat the said boxing will present either a perfectly vertical face or a curvilinear or convex or other desired surface, thus giving the vehicle a lighter and more graceful appearance. This I accomplish by arranging the supports for the tilting seat so that the latter will lie between them instead of resting on them, or, in other words, by hanging the tilting seat between its supports.

To these ends the invention consists in suspending the tilting seat of a vehicle from and between its supports, substantially as hereinafter fully described.

The manner of suspending the tilting seat between its side supporting-bars may be varied without departing from the nature of my invention. For instance, as shown in Figs. 2, 3, 4, and 6, the standards or the boxing s, for the tilting seat S, are provided with lugs L, and the side or supporting bars, B, are bent outward at the rear end, and provided with eyes or perforated ears E, for the reception of the lugs L, from which the tilting seat is supported. This arrangement may be reversed and the eyes or perforated ears may be secured to the standards or boxing s, and the lugs L to the side supporting-bars, B. Finally, if desired, the lugs L and ears or eyes E may be entirely dispensed with and a plane support projecting from the side bars, B, and having the proper inclination may be employed, upon which the standards or the boxing s of the tilting seat S rests when the latter is tilted back for use; or said support may extend from side bar to side bar, B, if desired.

In all other respects the vehicle is of the usual and well-known construction, and need not therefore be described in detail.

Having thus described the nature of my said invention, and how the same is to be performed, what I claim, and desire to secure by Letters Patent, is—

1. In a vehicle of the class described, the combination, with the tilting seat S, of bearings connected with the side supporting-bars and lying between the same and in a lower plane, substantially as and for the purposes specified.

2. In a vehicle of the class described, the combination, with the tilting seat provided with lugs L, projecting from its under side, of the side supporting-bars, B, provided with eyes or eyebolts E, projecting inwardly and downwardly therefrom to form bearings for said seat lying between and below the upper face of said side bars, substantially as and for the purposes specified.

In testimony that I claim the foregoing I have hereunto set my hand this 7th day of May, 1886.

HIPPOLYTE LAINÉ PLISSON.

Witnesses:
ROBT. M. HOOPER,
LEON SCHMITTHUHL.